(12) United States Patent
Kimura

(10) Patent No.: US 8,711,189 B2
(45) Date of Patent: Apr. 29, 2014

(54) RESOLUTION SETTING APPARATUS, RESOLUTION SETTING METHOD, AND RECORDING MEDIUM RECORDING A RESOLUTION SETTING PROGRAM WHEN A TELEVISION IS USED AS A MONITOR OF A COMPUTER

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1646 days.

(21) Appl. No.: 11/931,542

(22) Filed: Oct. 31, 2007

(65) Prior Publication Data

US 2008/0174615 A1  Jul. 24, 2008

(30) Foreign Application Priority Data

Jan. 12, 2007 (JP) ................................ 2007-005188

(51) Int. Cl.
*G09G 5/02* (2006.01)
(52) U.S. Cl.
USPC ............... 345/699; 713/1; 713/100; 345/690; 345/204; 345/87; 715/200
(58) Field of Classification Search
USPC ............................ 345/699; 713/100, 1, 100.1
See application file for complete search history.

(56) References Cited

U.S. PATENT DOCUMENTS

| 6,011,592 | A | * | 1/2000 | Vaughan et al. | 348/552 |
| 7,082,529 | B2 | * | 7/2006 | Cantwell et al. | 713/100 |
| 7,675,574 | B2 | * | 3/2010 | Ishii et al. | 348/558 |
| 2006/0071949 | A1 | | 4/2006 | Sakuma et al. | |
| 2007/0002142 | A1 | * | 1/2007 | Lim | 348/181 |
| 2007/0296727 | A1 | * | 12/2007 | Kumakawa | 345/520 |

FOREIGN PATENT DOCUMENTS

| JP | 2005-118340 | 5/2005 |
| JP | 2006-107009 | 4/2006 |

* cited by examiner

*Primary Examiner* — Grant Sitta
(74) *Attorney, Agent, or Firm* — Fujitsu Patent Center

(57) ABSTRACT

S1: BIOS invokes the second OS only at the first power-up. S2: Two resolution setting tools are invoked on the second OS. S3,S4: A mode check module verifies whether the display mode of the monitor is either an overscan mode or an underscan mode. S5: A test image and an Adjust button are displayed in the verified display mode, and Adjust information and EDID information upon completion of the adjustment that a user visually makes are output to a particular file. S7: The particular file is copied to a predetermined folder of the first OS. S8: The settings of BIOS are changed according to the contents of the particular file. S9: BIOS is restarted. S10 to S14: A POST screen, a logo of an OS maker, and a screen for opening the package of the first OS are displayed in a state where the rim of the screen is not cropped.

9 Claims, 2 Drawing Sheets

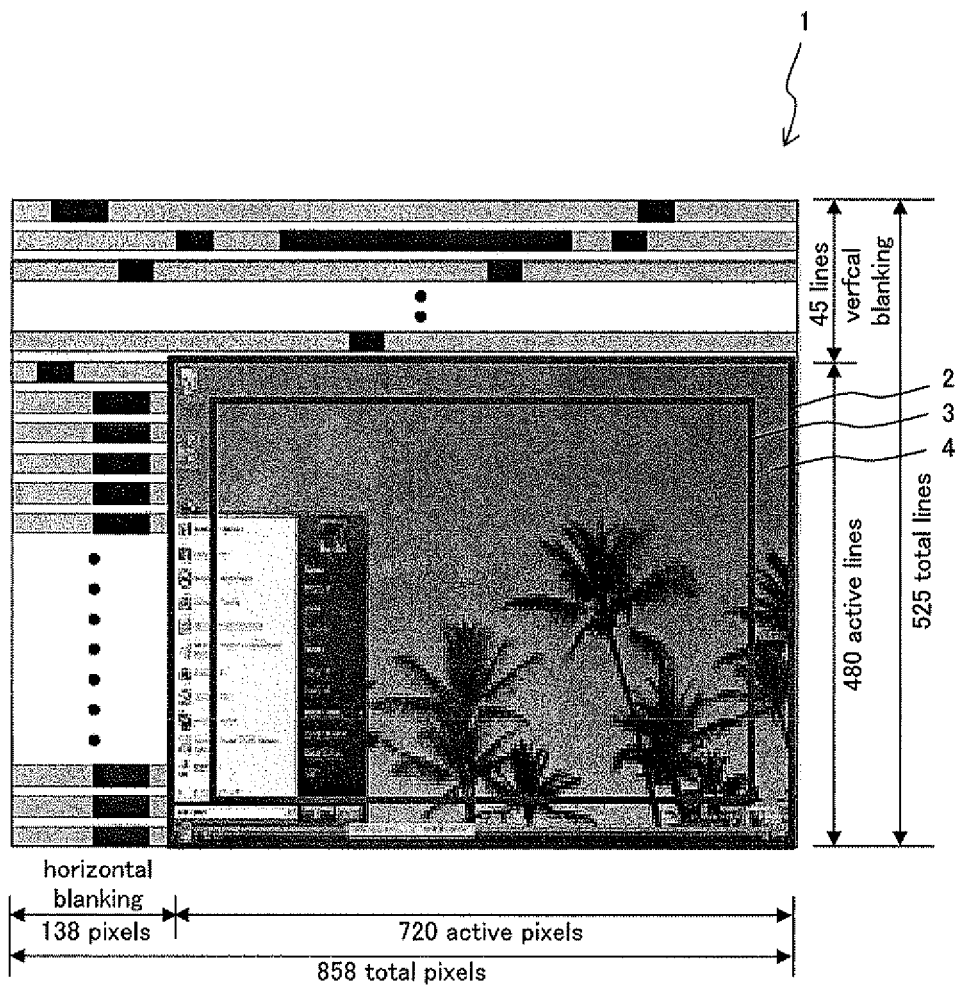
F I G. 1

RESOLUTION SETTING APPARATUS, RESOLUTION SETTING METHOD, AND RECORDING MEDIUM RECORDING A RESOLUTION SETTING PROGRAM WHEN A TELEVISION IS USED AS A MONITOR OF A COMPUTER

BACKGROUND OF THE INVENTION

1. Field of the Invention

The present invention relates to a resolution setting apparatus, a resolution setting method, and a recording medium recording a resolution setting program when a television is used as a monitor of a computer.

2. Description of the Related Art

For the screen display of a television (hereinafter abbreviated to TV), an overscan method is conventionally adopted so that a blank portion of a video image signal is not displayed on a screen. The overscan method is a method for displaying a portion called a safety frame in the central portion of a screen by cropping the top, the bottom, the right and the left of the screen.

In the meantime, an underscan method for displaying entire image data on the whole of a display screen is adopted for a monitor dedicated to a computer. The underscan method is a method for making a dot-by-dot display without cropping the top, the bottom, the left and the right of the screen of image data.

FIG. 1 shows a screen display of the overscan method and that of the underscan method for comparison. A display screen 1 shown in FIG. 1 represents a display screen having a display active area of 720(width)×480(height) pixels;

This display screen 1 has a blank portion of 138 pixels at the left of the display active area, and a blank portion of 45 lines at the top in the example shown in FIG. 1.

With an underscan display made in the display active area, entire image data indicated with an outer frame 2 is displayed in the whole of the display active area.

In the meantime, with an overscan display, an area of 85 percent from the center of the image data, which is indicated with an inner frame 3, is enlarged and displayed in the display active area. FIG. 1 shows the overscan area before being enlarged and displayed by enclosing the area with the inner frame 3.

Namely, a section indicated by a difference 4 between the outer frame 2 and the inner frame 3 of FIG. 1 is the cropped portions of the image data for the overscan display. Accordingly, if the underscan display of a computer is displayed unchanged on the screen of a liquid crystal TV, an image in the area of the difference 4 is not displayed.

For computers such as a laptop computer, a notebook computer, etc., the main bodies and the liquid crystal monitors of which are integrated as one piece, and for desktop computers to which a CRT (Cathode Ray Tube) or a dedicated liquid crystal monitor is attached, their monitors are dedicated to the computers. Therefore, their display modes are set to the underscan method by default.

Accordingly, no problems are posed when the package of first basic software (such as Windows (trademark: hereinafter ditto) OS (Operating System: basic software) or Mac (trademark: hereinafter ditto) OS) is opened after purchasing new computers of the above described types.

"The opening of the package of software" referred to in the present invention indicates an "operation for accepting the terms and conditions of the license agreement of basic software".

Incidentally, there are a considerable number of computer freaks users who purchase only the main body of a computer in which only BIOS (Basic Input/Output System) is installed, and use a TV monitor also as a monitor of the computer.

Such computer users connect a TV monitor to the main body of a computer that he or she has just purchased, and attempt to load and open the package of the first OS from an HD (Hard Disk) on which the first OS package before being opened is preinstalled, or from, for example, a CD-ROM (Compact Disc-Read Only Memory), which is inserted into a CD-ROM drive and on which the first OS package before being opened is stored, while viewing the TV monitor.

As a result, a screen for opening the package of the OS, which is set as the underscan display, is displayed on the TV monitor set as the overscan method. Therefore, various types of buttons and icons, which should be displayed in the above described section of the difference 4 at the top, the bottom, the right and the left of the screen if a dedicated computer monitor is used, sometimes lie offscreen and become invisible to user eyes.

Namely, various types of buttons such as "return", "next", "cancel", etc., which are displayed as a man-machine interface when the first OS package is opened, are sometimes displayed in the display area of the above described difference 4. Therefore, these buttons as a man-machine interface lie offscreen and disappear.

For this reason, a user cannot press, for example, an "OK" button as a response indicating acceptance to an inquiry, which is made by the first OS, about whether or not he or she accepts an agreement. If the user cannot accept the agreement, the package is regarded as being returned, and the first OS cannot be installed in the main body of the computer.

Additionally, a utility that can be set after the opening of a package is only the first OS. Therefore, the setting of a display mode cannot be made even if the first OS package is fortunately opened. As a result, various types of buttons and icons similarly lie offscreen and become invisible as described above on a screen of a system recovery running on the first OS, or on a screen of the settings of BIOS thereafter.

For example, if a key operation area at the time of POST (Power-On/Self-Test) is invisible, a setup or a boot menu cannot be invoked. Additionally, if a difference exists between a setting value returned by EDID (all of patterns of resolutions possessed on the side of a TV) and an actual display resolution, characters are blurred and become invisible.

This leads to the impossibility of the subsequent installations of various types of applications, and to the inconvenience of the unavailability of a TV monitor.

For the adjustment of a display area, for example, Japanese Published Unexamined Patent Application No. 2006-107009 discloses the technique related to the application setting method for a safety area set on an OS such as Windows, etc.

Additionally, for example, Japanese Published Unexamined Patent Application No. 2005-118340 discloses the technique that can guarantee the display of characters as an overscan display by taking overscan or underscan into account on the side of game software, and by displaying object data within a screen.

Although using the technique recited in Japanese Published Unexamined Patent Application No. 2006-107009 can avoid the problems of overscan and underscan, the problems cannot be avoided until the package of Windows OS as the first OS is properly opened and installed in the main body of a computer, and an application for setting a safety area is made to run on the Windows OS.

Namely, the package of Windows must be opened on the opening screen of Windows immediately after being purchased in the state where the top, the bottom, the right and the left of the screen are not displayed as described above. Therefore, the problem that a response using a man-machine interface cannot be made when the package of the first OS is opened, and the first OS cannot be installed in the main body of a computer is not solved.

Accordingly, an application for a safety area set on the first OS, which is intended to avoid the problems of overscan and underscan, cannot run.

Additionally, "the constant display of object data within a display screen", which is disclosed by Japanese Published Unexamined Patent Application No. 2005-118340, is made on the side of game software that runs on an already installed first OS, and the above described problem that the first OS cannot be installed in the main body of a computer is not solved.

SUMMARY OF THE INVENTION

An object of the present invention is to provide a resolution setting apparatus, a resolution setting method, and a recording medium recording a program thereof, which are intended to display a screen on a first OS, a second OS, BIOS, etc., without cropping the periphery of the screen when the package of the first OS is opened, even if a home appliance TV is used as a monitor of a computer, in consideration of the above described conventional circumstances.

A resolution setting apparatus in a first aspect of the present invention is a resolution setting apparatus when a television is used as a monitor of a computer in the computer having a digital interface that is connectable to the television. This apparatus comprises a determining unit determining whether or not an interface connected to the computer is the digital interface that is connectable to the television before an operation for accepting the terms and conditions of the license agreement of first basic software is performed, a setting unit causing a resolution or a display mode, which is output from the computer, to be set on second basic software with an external input if the determining unit determines that the interface is the digital interface that is connectable to the television, and a reflecting unit reflecting the resolution or the display mode, which is set by the setting unit, on the settings of the first basic software.

The display mode is, for example, an overscan display mode or an underscan display mode. Additionally, the reflecting unit reflects the set resolution or display mode on the first basic software, for example, when the television connected to the digital interface is changed to another television while a processing operation is being performed on the first basic software.

A resolution setting apparatus in a second aspect of the present invention is a resolution setting apparatus when a monitor device is used as a monitor of a computer by connecting the monitor device, which is se to make the display of an overscan device, to the computer, which executes the display process of an underscan device, with a digital interface. This apparatus comprises a determining unit determining whether or not an interface connected to the computer is the digital interface, which is connectable to the monitor device, before an operation for accepting the terms and conditions of the license agreement of first basic software is performed, a setting unit causing a resolution or display mode, which is output from the computer, to be set on second basic software with an external input so that the entire display screen of the underscan device, which is output from the computer, lies within the display screen of the overscan device, if the determining unit determines that the interface is the digital interface that is connectable to the monitor device, and a reflecting unit for reflecting the resolution or the display mode, which is set by the setting unit, on the settings of the first basic software.

A recording medium in a third aspect of the present invention is a recording medium on which is recorded a program for causing a processing unit to execute a control process for setting a resolution when a television is used as a monitor of a computer in the computer having a digital interface that is connectable to the television, the control process comprising a determining step of determining whether or not an interface connected to the computer is the digital interface, which is connectable to the television, before an operation for accepting the terms and conditions of the license agreement of the first basic software is performed, a setting step of causing a resolution or a display mode, which is output from the computer, to be set on second basic software with an external input if the determining step determines that the interface is the digital interface that is connectable to the television, and a reflecting step of reflecting the resolution or the display mode, which is set by the setting step, on the settings of the first basic software.

The display mode is, for example, an overscan display mode or an underscan display mode. Additionally, the reflecting step reflects the set resolution or display mode on the first basic software, for example, when the television connected to the digital interface is changed to another television while a processing operation is being performed on the first basic software.

A recording medium in a fourth aspect of the present invention is a recording medium on which is recorded a program for causing a processing unit to execute a control process for setting a resolution when a monitor device, which is set to make the display of an overscan device, is connected to a computer, which executes the display process of an underscan device, with a digital interface, and the monitor device is used as a monitor of the computer, the control process comprising a determining step of determining whether or not an interface connected to the computer is the digital interface, which is connectable to the monitor device, before an operation for accepting the terms and conditions of the license agreement of first basic software is performed, a setting step of causing a resolution or a display mode, which is output from the computer, to be set on second basic software with an external input so that the entire display screen of the underscan device, which is output from the computer, lies within the display screen of the overscan device, if the determining step determines that the interface is the digital interface that is connectable to the monitor device, and a reflecting step of reflecting the resolution or the display mode, which is set by the setting step, on the settings of the first basic software.

A resolution setting method in a fifth aspect of the present invention is a resolution setting method when a television is used as a monitor of a computer in the computer having a digital interface that is connectable to the television. This method comprises a determining step of determining whether or not an interface that is connected to a main body device is the digital interface that is connectable to the television, before an operation for accepting the terms and conditions of the license agreement of first basic software is performed, a setting step of causing a resolution or a display mode, which is output from the computer, to be set on second basic software with an external input if the determining step determines that the interface is the digital interface that is connectable to the television, and a reflecting step of reflecting the resolution or the display mode, which is set by the setting step, on the settings of the first basic software.

A resolution setting method in a sixth aspect of the present invention is a resolution setting method when a monitor device, which is set make the display of an overscan device, is connected to a computer, which executes the display process of an underscan device, with a digital interface, and the monitor device is used as a monitor of the computer. This method comprises a determining step of determining whether or not an interface connected to the computer is the digital interface, which is connectable to the monitor device, before an operation for accepting the terms and conditions of the license agreement of first basic software is performed, a setting step of causing a resolution or a display mode, which is output from the computer, to be set on second basic software with an external input so that the entire display screen of the underscan device, which is output from the computer, lies within the display screen of the overscan device, if the determining step determines that the interface is the digital interface that is connectable to the monitor device, and a reflecting step of reflecting the resolution or the display mode, which is set by the setting step, on the settings of the first basic software.

According to the present invention, the setting of overscan or underscan is made on the second OS (such as Windows PE, etc.) in the stage where the package of the first OS (such as Windows XP, etc.) is opened, and the set value is applied in and after the opening stage of the package of the first OS. Therefore, a screen can be displayed on the first OS, the second OS, BIOS, etc. without cropping the periphery of the screen when a home appliance TV is used as a monitor of a computer.

As a result, the package of the first OS can be opened, or the subsequent installation of an application that runs on the first OS can be made without causing any problems. Therefore, not only can a computer be placed in a living room to view a moving image or to enjoy AV software, but also a maintenance operation such as a recovery operation, etc can be performed without troublesomeness, leading to convenience.

BRIEF DESCRIPTION OF THE DRAWINGS

FIG. 1 shows a screen display of an overscan method and that of an underscan method for comparison.

DESCRIPTION OF THE PREFERRED EMBODIMENTS

Figure 2:
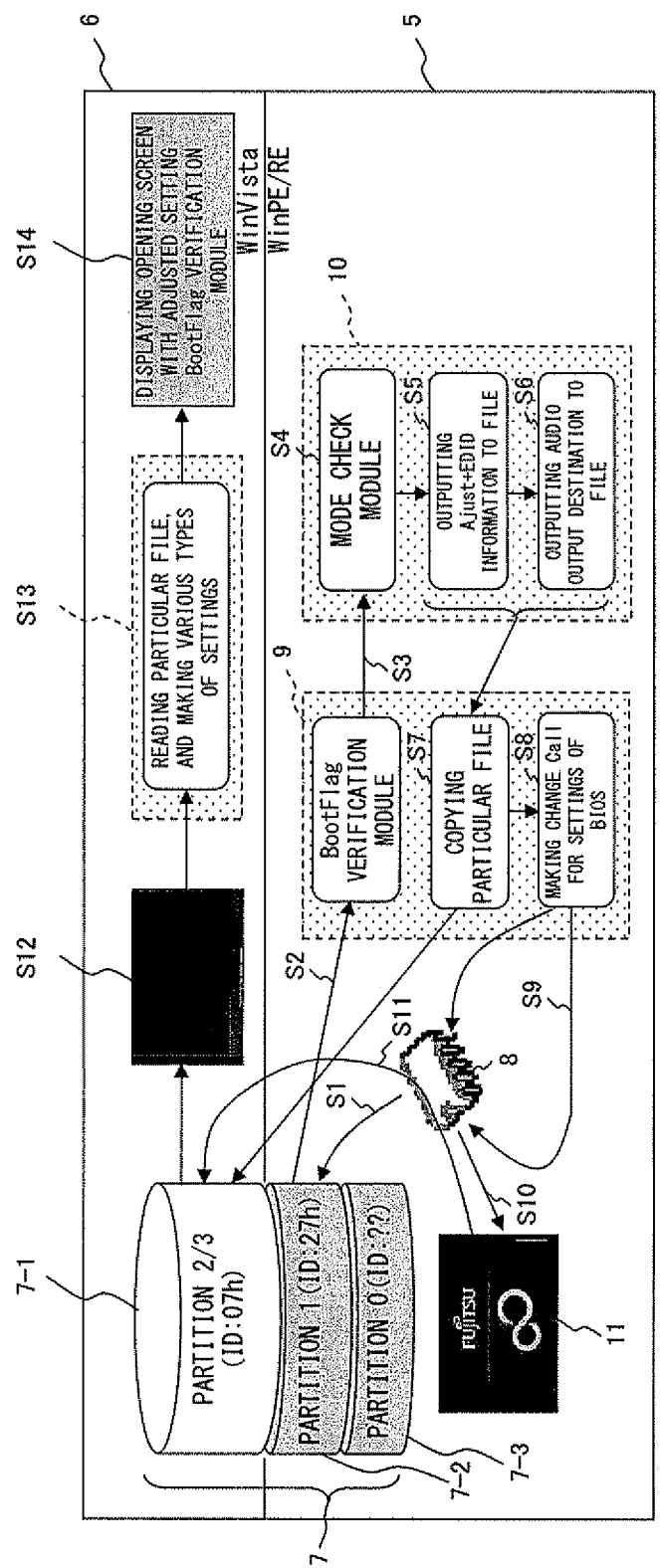
FIG. 2 shows a resolution setting system and the flow of its processing operations when a television is used as a monitor of a computer in a preferred embodiment.

A preferred embodiment according to the present invention is described below with reference to the drawings.

FIG. 2 shows a resolution setting system and the flow of its processing operations when a television is used as a monitor of a computer in a preferred embodiment.

As shown in FIG. 2, this resolution setting system is composed of a module running in a processing area 5 of WinPE/RE, and a module running in a processing area 6 of WinVista (Windows Vista).

WinVista is Windows OS, namely, the first OS of Windows. WinPE/RE is an application of a recovery system installed on an OS called PE (the second OS of Windows).

For WinPE, several types of resolutions are fundamentally preset as default values. For example, resolutions such as the lowest resolution of 800(width)×600(height) pixels, a high resolution of 1920(width)×1080(height) pixels are set depending on the size of a monitor screen.

Additionally, a storage device 7 shown in FIG. 2 is, for example, an HD, and partitioned into areas 7-1, 7-2 and 7-3.

The area 7-1 is a storage area in which the package of WinVista before being opened or after being opened is stored, and can be viewed with file management software such as Explorer, etc. This area is generally called a "partition 2/3 (ID:07h)".

The area 7-2 is an area in which WinPE/RE is stored, and cannot be viewed with file management software such as Explorer, etc. This area is generally called a "partition 1 (ID:27h)".

Furthermore, BIOS 8, a first utility 9 and a second utility 10 as resolution setting tools are embedded in this resolution setting system.

BIOS 8 is a hardware chip. Startup procedures that can run only once at power-up is embedded in BIOS 8 at the factory shipment of the computer so that BIOS 8 can recognize the procedures.

Furthermore, the first utility 9 and the second utility 10 may be respectively embedded as hardware chips, or may be pre-stored as normal applications in a suitable area of the storage device 7.

The first utility 9 and the second utility 10 are set to automatically run only once on WinPE/RE that is the second OS.

Processing operations up to the opening of the package of WinVista at the first power-up in the resolution setting system having the above described configuration are described below also with reference to FIG. 2.

When power is turned on in step S1, BIOS 8 boots up WinPE/RE only at the first power-up, and sets a boot flag for booting up invoking the second utility 10 in a predetermined flag area.

Next, in step S2, when WinPE/RE starts up, the first utility 9 automatically starts up on WinPE, which is the second OS, and the boot flag is passed from the second OS to the first utility 9.

Then, in step S3, the first utility 9 verifies the boot flag, and boots up a mode check module of the second utility 10, which is specified by the verified boot flag.

In step S4, the mode check module verifies whether a display mode, which is notified from a monitor device via an interface connected to a main body device, is either an overscan mode or an underscan mode.

Here, it is assumed that the TV is connected via the digital interface. However, if it is verified that a monitor dedicated to the computer is connected and the display mode is the underscan mode, the flow immediately skips to step S10.

Here, a predetermined test image of the underscan display mode is displayed on the TV screen, and an Adjust button is displayed at the center of the screen based on the verified display mode and EDID obtained from the TV via the digital interface.

Then, an adjustment is made so that the entire test image of the underscan display mode is displayed within the display area of the overscan display mode of the TV screen based on the operation of the Adjust button that a user performs while viewing the test image of the TV screen.

With this adjustment, the user makes the adjustment for displaying the entire test image within the TV screen by operating the Adjust button while visually verifying whether, for example, characters, etc. displayed in the rim of the test image either lie offscreen or within the display area.

Then, in step S5, information about the operation of the Adjust button, and the EDID information of the TV upon completion of the above described adjustment are output to a predetermined particular file.

In step S6, the user sets an audio output destination either to HDMI (the digital interface standard of home appliances) or to an externally attached speaker. This setting is output to the above described predetermined particular file, and a subsequent process is passed to the first utility 9.

The first utility 9 copies the predetermined particular file, to which the information about the operation of the Adjust button, the EDID information of the TV, and the information about the audio output destination of the computer are written with the operations of the above described steps S5 and S6, to a predetermined folder in the partition (area 7-1) of WinVista of the storage device 7, in step S7.

At the same time, in step S8, the display output method of the initial screen is changed based on the data written to the predetermined particular file by making a change Call for the settings of BIOS.

With this change, information about an overscan or underscan mode is passed to SBIOS (System BIOS), and further passed from SBIOS to VBIOS (Video BIOS) in BIOS 8.

Then, in step S9, BIOS 8 the display output method of which is adjusted to make an image output from the computer lie within the TV screen is restarted.

As a result, a POST (Power On/Self Test) screen is displayed by BIOS 8 in the set underscan or overscan mode. Namely, a logo 11 of a computer maker is displayed within the display screen of the TV in an appropriate state.

Next, WinVista is booted in step S11, and the logo of WinVista is displayed on the screen in step S12.

Then, in step S13, a graphic driver makes various types of settings such as the display mode of the screen, the setting value of a resolution based on the information about the operation of the Adjust button, and other settings by reading the predetermined particular file.

In step S14, a screen for opening the package of WinVista is displayed based on the adjusted setting with which the entire screen of the output image of the computer lies within the display screen of the TV.

As described above, according to the present invention, the setting of overscan or underscan is made on the second OS in the stage where the package of the first OS is opened, and this setting value is applied in and after the opening stage of the package of the first OS. Therefore, a screen is displayed without cropping its periphery on the first OS, the second OS, BIOS, etc. when a home appliance TV is used as a monitor of a computer. As a result, the opening of the package of the first OS, the subsequent installation of an application running on the first OS, and such operations can be smoothly performed without causing any problems.

Accordingly, not only can a computer be placed in a living room to view a moving image or to enjoy AV software, but also maintenance operations such as a recovery operation, etc. can be performed without troublesomeness, leading to convenience.

The above described preferred embodiment provides the explanation by taking as an example the case where a TV is used as a monitor of a computer. However, the present invention is not limited to this implementation, and also applicable, as a matter of course, to a case where a monitor device that is set to make an overscan display, and a computer having a digital interface that is connectable to the monitor device are connected, and the package of the first OS is opened.

What is claimed is:

1. A resolution setting apparatus of a computer comprising:
   a determining unit to determine, before an operation for accepting terms and conditions of a license agreement of a first operating system software to be installed on the computer is performed, whether a digital interface connects the computer to a television and whether a display mode of the television is an overscan mode;
   a setting unit to cause, when the determining unit determines that a digital interface connects the computer to a television and the display mode of the television is an overscan mode, a display mode of a second operating system software or a set of software tools corresponding to the first operating system software to be set to an overscan mode; and
   a reflecting unit to reflect the display mode, which is set by the setting unit, on settings of the first operating system software.

2. The resolution setting apparatus according to claim 1, wherein
   the reflecting unit reflects the display mode on the first operating system software when the television connected to the digital interface is changed to another television while a processing operation is being performed on the first operating system software.

3. A resolution setting apparatus of a computer comprising:
   a determining unit to determine before an operation for accepting terms and conditions of a license agreement of a first operating system software to be installed on the computer is performed, whether a digital interface connects the computer to a monitor and whether a display mode of the monitor is an overscan mode;
   a setting unit to cause, when the determining unit determines that a digital interface connects the computer to the monitor and the display mode of the monitor is an overscan mode, a display mode of a second operating system software or a set of software tools corresponding to the first operating system software to be set to an overscan mode; and
   a reflecting unit to reflect the display mode, which is set by the setting unit, on settings of the first operating system software.

4. A non-transitory computer-readable recording medium on which is recorded a program for causing a processing unit to execute a control process for setting a display resolution of a computer, the control process comprising:
   determining, before an operation for accepting terms and conditions of a license agreement of a first operating system software to be installed on the computer is performed, whether a digital interface connects the computer to a television and whether a display mode of the television is an overscan mode;
   setting, when the determining determines that a digital interface connects the computer to a television and the display mode of the television is an overscan mode, a display mode of a second operating system software or a set of software tools corresponding to the first operating system software to be set to an overscan mode; and
   reflecting the display mode, which is set by the setting, on settings of the first operating system software.

5. The non-transitory computer-readable recording medium according to claim 4, wherein
   the reflecting reflects the display mode on the first operating system software when the television, which is connected to the digital interface, is changed to another television while a processing operation is being performed on the first operating system software.

6. A non-transitory computer-readable recording medium on which is recorded a program for causing a processing unit to execute a control process for setting a display resolution of a computer, the control process comprising:
   determining, before an operation for accepting terms and conditions of a license agreement of a first operating system software to be installed on the computer is performed, whether a digital interface connects the computer to a monitor and whether a display mode of the monitor is an overscan mode;

setting, when the determining determines that a digital interface connects the computer to a monitor and the display mode of the monitor is an overscan mode, a display mode of a second operating system software or a set of software tools corresponding to the first operating system software to be set to an overscan mode; and reflecting the display mode, which is set by the setting, on settings of the first operating system software.

7. A resolution setting method of a computer, the method comprising:

determining, before an operation for accepting terms and conditions of a license agreement of a first operating system software to be installed on the computer is performed, whether a digital interface connects the computer to a television and whether a display mode of the television is an overscan mode;

setting, when the determining determines that a digital interface connects the computer to a television and the display mode of the television is an overscan mode, a display mode of a second operating system software or a set of software tools corresponding to the first operating system software to be set to an overscan mode; and reflecting the display mode, which is set by the setting, on settings of the first operating system software.

8. The resolution setting method according to claim 7, wherein the reflecting reflects the display mode on the first operating system software when the television connected to the digital interface is changed to another television while a processing operation is being performed on the first operating system software.

9. A resolution setting method of a computer, the method comprising:

determining, before an operation for accepting terms and conditions of a license agreement of a first operating system software to be installed on the computer is performed, whether a digital interface connects the computer to a monitor and whether a display mode of the monitor is an overscan mode;

setting when the determining determines that a digital interface connects the computer to a monitor and the display mode of the monitor is an overscan mode, a display mode of a second operating system software or a set of software tools corresponding to the first operating system software to be set to an overscan mode; and reflecting the display mode, which is set by the setting, on settings of the first operating system software.

* * * * *